(12) United States Patent  
Yi (10) Patent No.: US 10,638,344 B2  
(45) Date of Patent: Apr. 28, 2020

(54) METHOD AND APPARATUS FOR DEFINING RECEIVED SIGNAL STRENGTH INDICATOR FOR DISCOVERY SIGNALS IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/227,727

(22) Filed: Dec. 20, 2018

(65) Prior Publication Data

US 2019/0150008 A1     May 16, 2019

Related U.S. Application Data

(63) Continuation of application No. 15/327,518, filed as application No. PCT/KR2015/008757 on Aug. 21, 2015, now Pat. No. 10,178,568.

(Continued)

(51) Int. Cl.
*H04W 24/08* (2009.01)
*H04B 17/318* (2015.01)

(Continued)

(52) U.S. Cl.
CPC .......... *H04W 24/08* (2013.01); *H04B 17/309* (2015.01); *H04B 17/318* (2015.01);

(Continued)

(58) Field of Classification Search
None
See application file for complete search history.

(56) References Cited

U.S. PATENT DOCUMENTS 10,178,568 B2    1/2019  Yi
2012/0213109 A1   8/2012  Xu et al.
(Continued)

FOREIGN PATENT DOCUMENTS

EP      2949063      12/2015
TW     201429202      7/2014
(Continued)

OTHER PUBLICATIONS

European Patent Office Application Serial No. 15833773.3, Office Action dated Oct. 8, 2018, 10 pages.

(Continued)

*Primary Examiner* — Hong S Cho
(74) *Attorney, Agent, or Firm* — Lee Hong Degerman Kang Waimey (57) ABSTRACT

A method and apparatus for performing measurements in a wireless communication system is provided. The method includes receiving an indication on measurements based on a discovery signal from a network, and performing measurements only in discovery signal occasions. In another aspect, a user equipment (UE) includes a memory, a transceiver, and a processor coupled to the memory and the transceiver, and configured to control the transceiver to receive an indication on measurements based on the discovery signal from the network, and perform measurements only in discovery signal occasions.

18 Claims, 7 Drawing Sheets

Related U.S. Application Data (60) Provisional application No. 62/040,421, filed on Aug. 22, 2014.

(51) Int. Cl.
| | | |
|---|---|---|
| *H04L 5/00* | (2006.01) | |
| *H04L 1/20* | (2006.01) | |
| *H04L 27/26* | (2006.01) | |
| *H04B 17/309* | (2015.01) | |
| *H04B 17/327* | (2015.01) | |
| *H04L 1/18* | (2006.01) | |

(52) U.S. Cl.
CPC ............ *H04B 17/327* (2015.01); *H04L 1/20* (2013.01); *H04L 5/005* (2013.01); *H04L 5/0092* (2013.01); *H04L 27/2613* (2013.01); *H04L 27/2666* (2013.01); *H04L 1/1861* (2013.01)

(56) References Cited

U.S. PATENT DOCUMENTS

| | | | | |
|---|---|---|---|---|
| 2013/0229931 | A1 | 9/2013 | Kim | |
| 2015/0092768 | A1* | 4/2015 | Ng | H04W 48/16 370/350 |
| 2015/0215856 | A1* | 7/2015 | Kim | H04W 48/16 370/252 |
| 2015/0264592 | A1* | 9/2015 | Novlan | H04L 27/2601 370/252 |
| 2016/0037513 | A1* | 2/2016 | Zhang | H04W 72/0446 370/336 |
| 2016/0242061 | A1* | 8/2016 | Harada | H04L 5/0098 |
| 2017/0181019 | A1 | 6/2017 | Yi | |
| 2018/0049114 | A1* | 2/2018 | Han | H04B 17/24 |

FOREIGN PATENT DOCUMENTS

| | | |
|---|---|---|
| WO | 2013025057 | 2/2013 |
| WO | 2014110795 | 7/2014 |
| WO | 2014116050 | 7/2014 |
| WO | 2015137782 | 9/2015 |

OTHER PUBLICATIONS

Microsoft, "Design of discovery signals", 3GPP TSG RAN WG1 Meeting #78, R1-143200, Aug. 2014, 3 pages.
Microsoft, "Discovery signal based RRM measurement procedures", 3GPP TSG RAN WG1 Meeting #78, R1-143201, Aug. 2014, 3 pages.
NTT Docomo, "Views on detailed design of discovery signal(s)", 3GPP TSG RAN WG1 Meeting #78, R1-143215, Aug. 2014, 5 pages.
TSG RAN WG1: "LS on agreements on small cell discovery", 3GPP Draft, 3GPP TSG RAN WG2 Meeting #87, R2-143928_R1-143610, Aug. 2014, 3 pages.
European Patent Office Application Serial No. 15833773.3, Search Report dated Jan. 31, 2018, 11 pages.
Huawei, et al., "Discussion on network assistance signaling for small cell discovery", 3GPP TSG RAN WG1 Meeting #78, R1-142828, Aug. 2014, 5 pages.
NTT Docomo, "Views on discovery signal-based RRM measurement procedures", 3GPP TSG RAN WG1 Meeting #78, R1-143216, Aug. 2014, 6 pages.
Samsung, "Discovery signal-based RRM measurement procedures", 3GPP TSG RAN WG1 Meeting #78, R1-143068, Aug. 2014, 5 pages.
PCT International Application No. PCT/KR2015/008757, International Search Report dated Jan. 29, 2016, 2 pages.
Alcatel-Lucent et al., "Discovery Signal RRM measurement procedure for Small Cell ON/OFF", R1-143010, 3GPP TSG RAN WG1 Meeting #78, Aug. 10, 2014, 5 pages.
Fujitsu, "Configuration of DRS", R1-142926, 3GPP TSG RAN WG1 Meeting #78, Aug. 10, 2014, 5 pages.
Intel Corporation, "RRM measurement for small cell discovery signal", R1-142029, 3GPP TSG RAN WG1 Meeting #77, May 10, 2014, 9 pages.
3rd Generation Partnership Project (3GPP), "Technical Specification Group Radio Access Network; Evolved Universal Terrestrial Radio Access (E-UTRA); Physical channels and modulation (Release 12)," Section 6A0 of 3GPP TS 36.211 V12.2.0, Jun. 2014, 24 pages.
Taiwan Intellectual Property Office Application No. 104127569, Patent Ceriticate dated Feb. 11, 2017, 12 pages.
United States Patent and Trademark Office U.S. Appl. No. 15/327,518, Office Action dated May 9, 2018, 18 pages.

\* cited by examiner

METHOD AND APPARATUS FOR DEFINING RECEIVED SIGNAL STRENGTH INDICATOR FOR DISCOVERY SIGNALS IN WIRELESS COMMUNICATION SYSTEM

CROSS-REFERENCE TO RELATED APPLICATIONS

This application is a continuation of U.S. patent application Ser. No. 15/327,518, filed on Jan. 19, 2017, now U.S. Pat. No. 10,178,568, which is the National Stage filing under 35 U.S.C. 371 of International Application No. PCT/KR2015/008757, filed on Aug. 21, 2015, which claims the benefit of U.S. Provisional Application No. 62/040,421, filed on Aug. 22, 2014, the contents of which are all hereby incorporated by reference herein in their entirety.

BACKGROUND OF THE INVENTION

Field of the Invention

The present invention relates to wireless communications, and more particularly, to a method and apparatus for defining a received signal strength indicator (RSSI) for discovery signals in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

For small cell enhancements, physical layer aspects have been discussed. Specifically in 3GPP LTE rel-12, when a number of small cells are deployed in a macro cell coverage, the feature of small cell on/off has been discussed, in order to reduce interference, which may occur since all small cells are turned on, and to increase user packet throughput (UPT) of a user equipment (UE). To support fast transition between on/off states of the small cell, various technologies have been studied, one of which is a discovery signals. The discovery signals may be called a discovery reference signal (DRS).

As the discovery signals are introduced, a method for performing measurements by using the discovery signals efficiently may be required.

SUMMARY OF THE INVENTION

The present invention provides a method and apparatus for defining a received signal strength indicator (RSSI) for discovery signals in a wireless communication system. The present invention provides a method for designing discovery signals used for efficient cell discovery. The present invention provides a method for performing measurements only in discovery signal occasions.

In an aspect, a method for performing, by a user equipment (UE), measurements in a wireless communication system is provided. The method includes receiving an indication on measurements based on discovery signal from a network, and performing measurements only in discovery signal occasions.

In another aspect, a user equipment (UE) includes a memory, a transceiver, and a processor coupled to the memory and the transceiver, and configured to control the transceiver to receive an indication on measurements based on discovery signal from a network, perform measurements only in discovery signal occasions.

Measurements can be performed efficiently only in discovery signal occasions.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
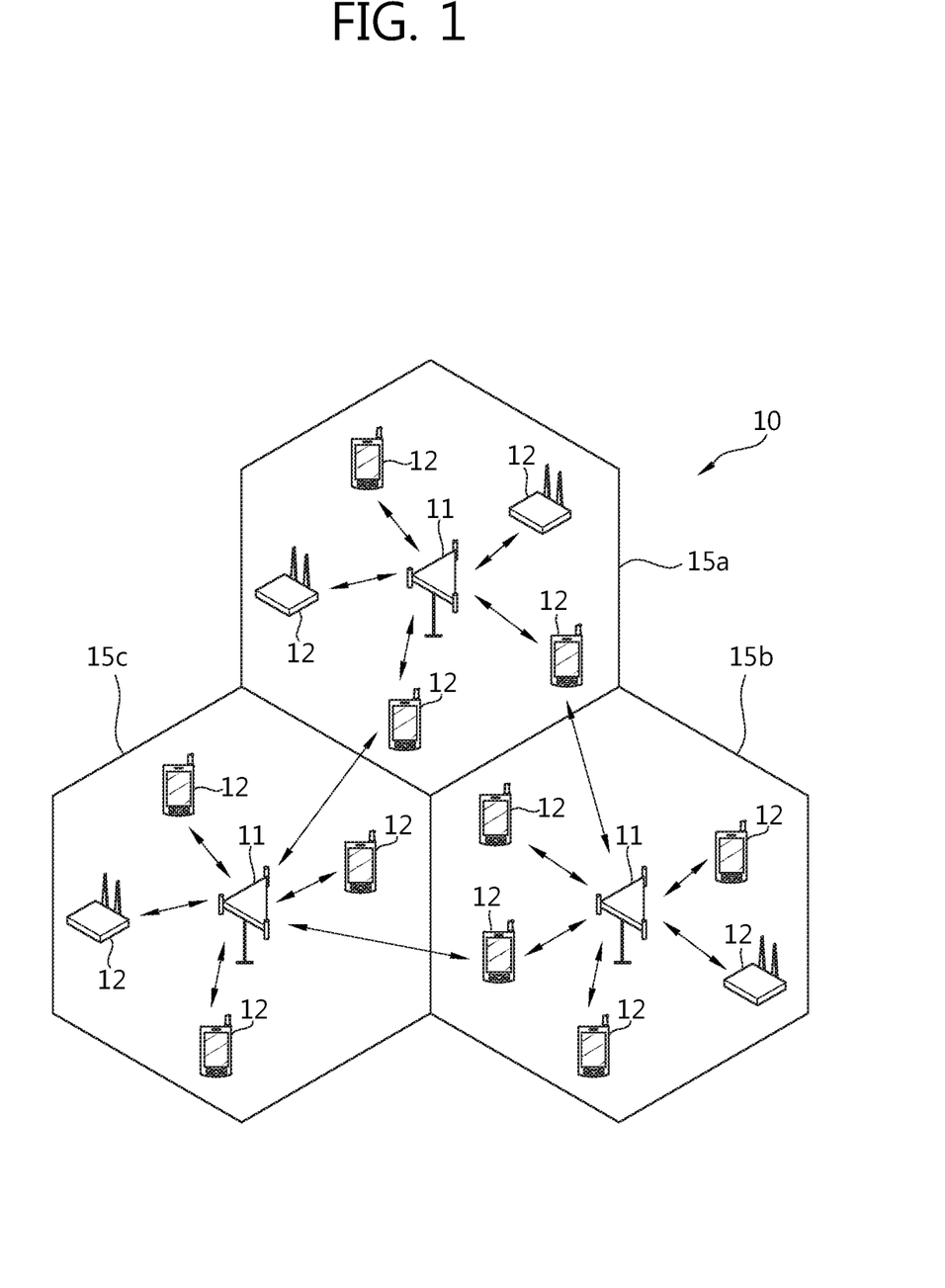
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
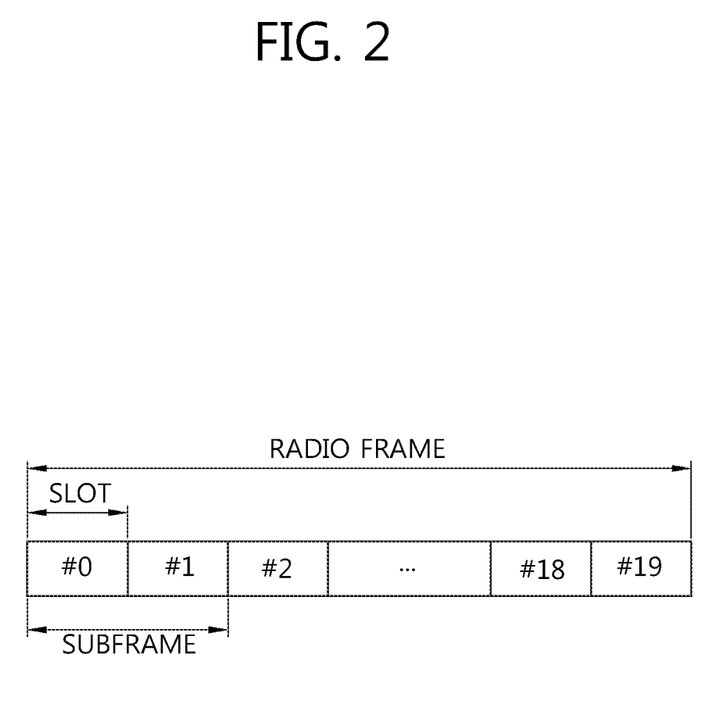
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
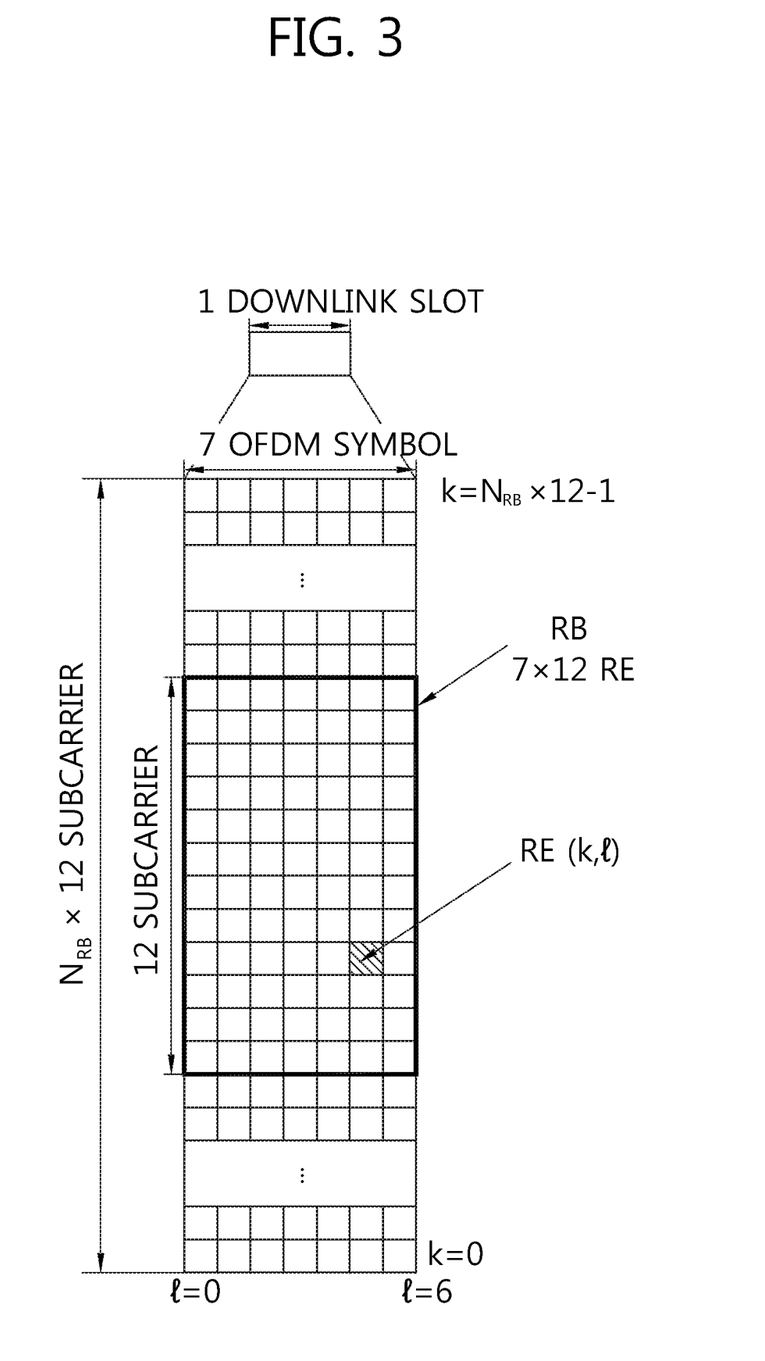
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
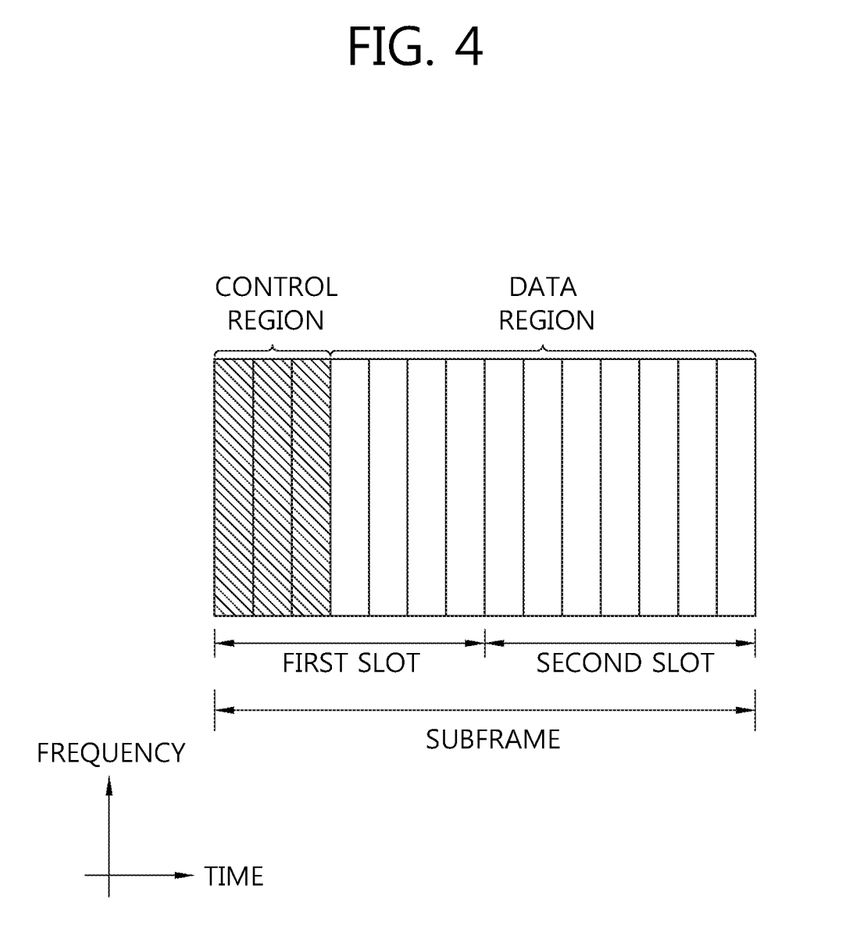
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
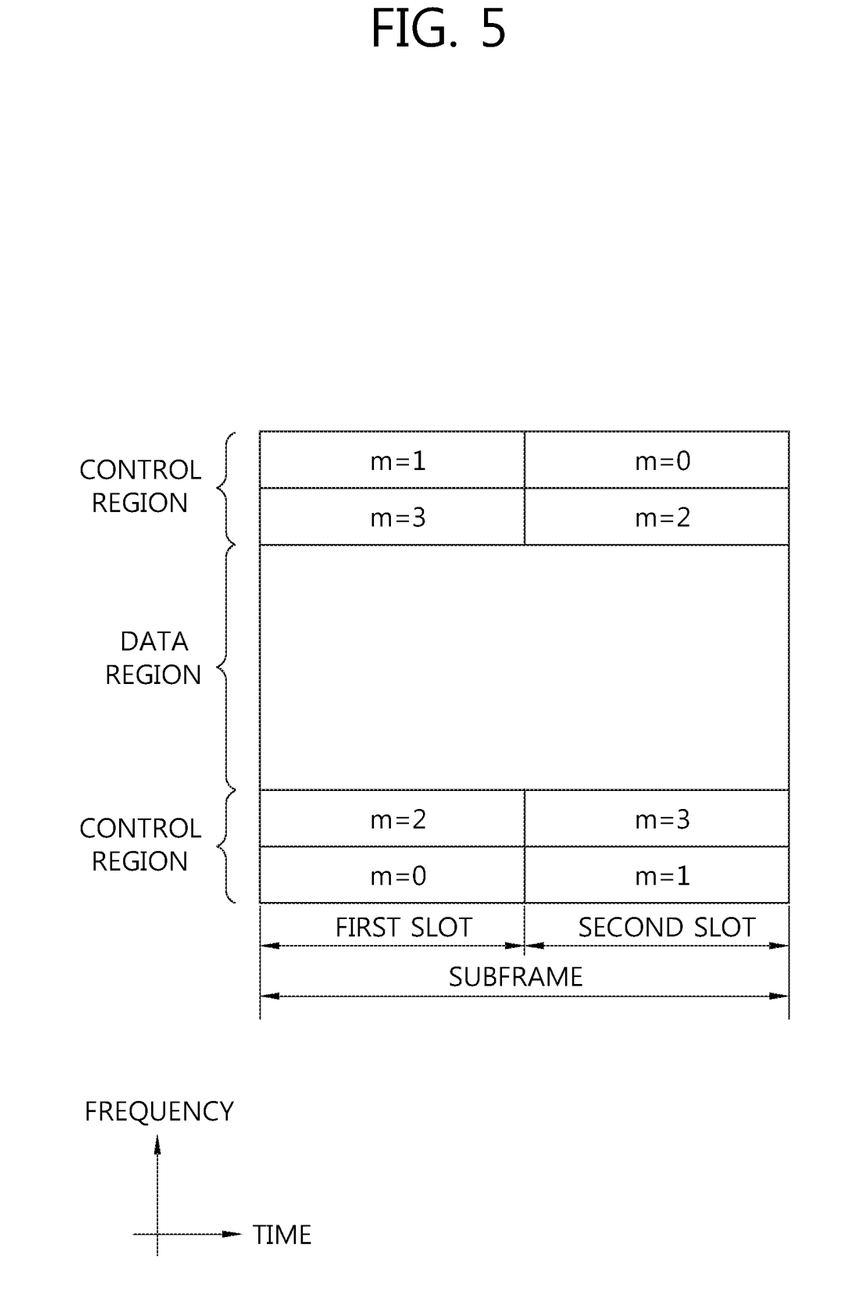
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Various kinds of DL reference signal (RS) are described. It may be referred to Section 6.10 of 3GPP TS 36.211 V12.2.0 (2014-06). Six types of DL reference signals are defined, which include cell-specific reference signal (CRS), multicast-broadcast single-frequency network (MBSFN) reference signal, UE-specific reference signal (i.e. demodulation reference signal (DM-RS)) associated with PDSCH, DM-RS associated with enhanced PDCCH (EPDCCH), positioning reference signal (PRS), and channel state information reference signal (CSI-RS). There is one RS transmitted per DL antenna port.

CRSs shall be transmitted in all DL subframes in a cell supporting PDSCH transmission. CRS are transmitted on one or several of antenna ports 0 to 3. MBSFN reference signal shall be transmitted in the MBSFN region of MBSFN subframes only when the physical multicast channel (PMCH) is transmitted. MBSFN reference signals are transmitted on antenna port 4. MBSFN reference signals are defined for extended CP only. UE-specific reference signals associated with PDSCH are transmitted on antenna port(s) $p=5$, $p=7$, $p=8$ or $p=7, 8, \ldots, v+6$, where v is the number of layers used for transmission of the PDSCH, are present and are a valid reference for PDSCH demodulation only if the PDSCH transmission is associated with the corresponding antenna port, and are transmitted only on the physical resource blocks upon which the corresponding PDSCH is mapped. The DM-RS associated with EPDCCH is transmitted on the same antenna port $p \in \{107,108,109,110\}$ as the associated EPDCCH physical resource, is present and is a valid reference for EPDCCH demodulation only if the EPDCCH transmission is associated with the corresponding antenna port, and is transmitted only on the physical resource blocks upon which the corresponding EPDCCH is mapped. PRSs shall only be transmitted in resource blocks in DL subframes configured for PRS transmission. CSI RSs are transmitted on one, two, four or eight antenna ports using $p=16$, $p=15, 16$, $p=15, \ldots, 18$ and $p=15, \ldots, 22$, respectively.

In a dense small cell scenario, it is likely that a UE is connected with an overlaid macro and small cell for data offloading. In such a case, it is desirable for a UE to discover many cells within a communication range, and then, the overlaid macro layer may select the best cell considering loading information as well as other information. In other words, the best cell for data offloading may not be the best cell based on reference signal received power (RSRP)/reference signal received quality (RSRQ). Rather, a cell with low loading or many users may be desirable from overall cell management perspective. Thus, an advanced discovery procedure to allow detecting more cells than conventional mechanism may be considered.

In terms of desired characteristics of advanced discovery signal, at least one of the followings may be considered.

(1) Detect more cells than legacy primary synchronization signal (PSS)/secondary synchronization signal (SSS)/CRS based cell detection (2) Detect cells in a short time, such as in a subframe (3) Perform measurement in a short time, such as in a subframe (4) Support necessary measurement for fast time scale on/off operation According to an embodiment of the present invention, a few candidates may be considered for advanced discovery algorithm as follows.

(1) PSS/(SSS)+CRS
(2) PSS/(SSS)+CSI-RS
(3) PSS/(SSS)+PRS
(4) PSS+SSS+CRS+(CSI-RS)
(5) Combination of one or more options of (1)-(3) described above
(6) PSS+SSS+CRS+(CSI-RS): In this case, a UE may assume that CSI-RS is present only if configured with CSI-RS configuration such as scrambling identifier (ID), the resource configurations for CSI-RS, etc. In other words, a UE may perform transmission point (TP) identification only if network assistance related to CSI-RS is configured or the explicitly configured with the presence of CSI-RS resource.

Further, in 3GPP LTE, a discovery signal (or, discovery reference signal (DRS)) has been newly introduced for one aspect of small cell enhancements. Hereinafter, discovery signal and DRS may be used interchangeably. A small call in off state may transmit the discovery signal for the UE to discovery the small cell. In order for the UE to receive immediately data packet which is to be transmitted when the small cell transits to on state, the small cell may carry information, which is necessary for procedures which should have been performed before the small transits to on state, in the discovery signal.

It is expected that discovery signal should be used for coarse time/frequency tracking, measurement and quasi-collocation (QCL) (if necessary). Considering some of objectives, the design of discovery signal should meet the following requirements.

(1) Discovery signal should support coarse time synchronization with assumption of very high initial timing error (such as +−2.5 ms)

(2) Discovery signal should support coarse frequency synchronization with assumption of very high initial frequency error (such as 20 KHz)

(3) Discovery signal should support the detectability of at least three cells (or transmission points)

(4) Discovery should support sufficient accuracy of measurement

To support (1) and/or (2), it may be assumed that PSS and/or SSS is transmitted.

In terms of designing discovery signals, the following questions should be answered.

(1) In the same frequency, can cells transmitting advanced discovery signal and cells not transmitting advanced discovery signals coexist or not?

(2) If a cell transmits advanced discovery signals, will it transmit discovery signals in off-state as well as in on-state?

(3) From a UE measurement reporting perspective, does a UE report both measurement reports based on legacy and advanced discovery signals if available or report only one? When it reports only one, what is the criteria to select one report?

(4) Whether a UE can perform measurement based on advanced discovery signal even in discontinuous reception (DRX) mode: If this is supported, it may be required that a UE shall wake-up even in DRX cycle (not in OnDuration) to perform the measurement following DRS transmission timing/configuration. For example, if DRS is transmitted in every 160 ms, a UE shall wake up every 160 ms to perform the measurement.

(5) How does multiplexing between discovery signals from different cells will be performed? (Via time division multiplexing (TDM)/frequency division multiplexing (FDM)/code division multiplexing (CDM))

(6) Is there any active data transmission in subframe where discovery signal is transmitted? Without active data transmission, how to measure received signal strength indicator (RSSI)?

(7) Is there any necessity to increase the number of cell IDs from 504?

(8) What if system frame number (SFN) is not aligned among cells transmitting discovery signals together for efficient UE performance?

(9) What if CP length is not aligned among cells transmitting discovery signals together for efficient UE performance?

(10) What if discovery signal has been scheduled in MBSFN subframe?

(11) Are discovery signal transmission period and resource configuration should be configurable?

(12) How to transmit discovery signal in TDD?

For an easy configuration, the periodicity of advanced discovery signals can be considered with the following constraints according to an embodiment of the present invention.

(1) Multiple of measurement gap period: For example, 40 ms, 80 ms, or 160 ms or 320 ms may be configured (if a new measurement gap period is configured, multiple of those new periods may be also considered).

(2) Align with DRX cycle: For example, 10, 20, 32, 40, 64, 80, 128, 160, 256, 320, 512, 640, 1024, 1280, 2048, 2560 subframes may be configured (this constraint may be eliminated if a UE can measure using legacy signals for the serving cell).

(3) If PSS/SSS are transmitted in discovery signal, the periodicity of discovery signal may be multiple of 5 ms so that PSS/SSS transmitted for advanced discovery signal can be replaced by PSS/SSS transmitted in on-state. If discovery signal is not transmitted in on-state, this constraint may be eliminated. Or to avoid impact on legacy UE, different periodicity not aligned with PSS/SSS may be also considered such that PSS/SSS can be transmitted during on-state while additional PSS/SSS can be also transmitted for discovery signal transmission. If DRS-PSS and DRS-SSS are additionally transmitted separately from PSS/SSS transmitted in on-state, the cell ID between DRS-PSS/DRS-SSS may be different from PSS/SSS. Also, QCL relationship between DRS-PSS/DRS-SSS and PSS/SSS may not be assumed. In that case, a QCL relationship DRS-CSI-RS (or DRS-CRS) and PSS/SSS and/or CRS may be configured where DRS-CSI-RS may be used for PSS/SSS and/or CRS decoding/tracking. In that case, the cell ID used for DRS-CSI-RS and PSS/SSS and/or CRS may be assumed to be equal. If the cell ID used for DRS-PSS/DRS-SSS is same to that of PSS/SSS, DRS-PSS/DRS-SSS may be replaced by PSS/SSS if DRS-PSS/DRS-SSS collide with PSS/SSS if two collide. Otherwise, PSS/SSS may be dropped when two collide.

When RSSI is measured over all OFDM symbols in DRS occasion, at least one of the followings may be considered according to an embodiment of the present invention.

(1) Since DRS measurement timing configuration (DMTC) may include one or more blank subframes, a UE may be assumed that it measures RSSI on the same subframes where RSRP is measured.

(2) A UE have flexibility to choose RSSI and/or RSRP subframes. However, it should be restricted to DRS occasion which is inferred by DMTC configuration and DRS occasion duration and detecting SSS subframe. More specifically, if higher layers indicate measurements based on DRS, RSSI is measured over all OFDM symbols of the DL part of the subframes in the configured DRS occasions. Since SSS comes in the first subframe both in FDD and TDD, a UE may assume that DRS occasion of a cell consists of consecutive DL subframes and special subframes starting from the subframe where SSS is located. The UE needs to restrict its measurement on both RSRP and RSSI within those subframes where DRS from a cell is expected. In other words, within a DMTC, subframe not used by DRS occasion is not used for UE measurement on RSRP and RSSI/RSRQ.

(3) If a DRS occasion duration is 1 ms, a UE may measure RSSI and/or RSRP where SSS is detected. If a DRS occasion duration is 2 ms, a UE may measure RSSI and/or RSRP where SSS is detected and the next subframe. If DRS occasion duration is 3 ms, a UE may measure a UE measures RSSI and/or RSRP where SSS is detected and the next two subframes. If DRS occasion duration is 4 ms, a UE may measure a UE measures RSSI and/or RSRP where SSS is detected and the next subframe and the 4th subframe. If DRS occasion is 5 ms, a UE may measure RSSI and/or RSRP where SSS is detected and the next subframe and the 5th subframe. Among those candidate subframes, it is up to the UE to choose a subset of subframes. Alternatively, a UE may be mandated to measure RSSI over those determined subframes. It is still up to UE implementation to choose a subset of subframes for RSRP. Alternatively, even for RSRP, it may be restricted to those subframes.

(4) A UE may measure RSSI and/or RSRP on any DL and/or DL pilot time slot (DwPTS) within a DRS occasion which is inferred from detection of SSS and DMTC configuration. Regardless of serving cell configuration in a frequency, if a UE is configured with primary cell (PCell), DMTC configuration may follow PCell timing. More specifically, if a UE is configured with 80 ms and/or 160 ms, or a UE is configured with measurement gap where measurement gap period is smaller than DMTC period (e.g., measurement gap with 40 ms whereas DMTC period is 80 ms), a UE may be expected to measure RSRP and/or RSRQ over all DL subframes and DwPTS of special subframes detected as DRS occasion by detecting SSS and by DRS occasion duration configuration. If DRS occasion duration is not given, a UE may assume 1 ms as a default value. If DMTC configuration is not explicitly given or in the middle of reconfiguration, a UE may assume 160 ms as a default value.

Particularly, for a UE in RRC_IDLE, DMTC configuration on a frequency may be fall-backed as follows.

No CSI-RS based measurement is configured, and thus ignore all DRS-CSI-RS related configuration
DMTC configuration may be still applicable
DRS occasion duration is 1 ms
DMTC periodicity is 160 ms
UE finds a DRS occasion by detecting SSS At least supporting UE in RRC_IDLE, a cell may transmit "DRS-transmission" in system information block (SIB) which indicates that a cell transmits DRS and/or may not transmit legacy CRS in other subframes other than DRS occasion. In this case, a UE may assume that at least every 160 ms, DRS transmission occurs. Thus, measurement may occur in 160 ms, which is the maximum periodicity of DMTC. If it is less than 160 ms, it may assume that DRS is transmitted at least within that periodicity.

RSRQ for discovery signals (D-RSRQ) may be defined by Table 1 according to an embodiment of the present invention.

TABLE 1

| Definition | D-RSRQ is defined as the ratio N × RSRP/(E-UTRA carrier RSSI), where N is the number of RB's of the E-UTRA carrier RSSI measurement bandwidth. The measurements in the numerator and denominator shall be made over the same set of resource blocks. E-UTRA carrier RSS) comprises the linear average of the total received power (in [W]) observed from all downlink and DwPTS OFDM symbols of the subframes where D-RSRP is measured. The reference point for the D-RSRQ shall be the antenna connector of the UE. If receiver diversity is in use by the UE, the reported value shall not be lower than the corresponding RSRQ of any of the individual diversity branches. |
|---|---|
| Applicable for | RRC_IDLE intra-frequency, RRC_IDLE inter-frequency, RRC_CONNECTED intra-frequency, RRC_CONNECTED inter-frequency |

For intra-frequency measurements in a TDD band, if higher layers indicate certain subframes for performing RSRQ measurements, and an indicated subframe is a special subframe in the serving cell, the UE may be to measure DwPTS OFDM symbols for all cells according to the serving cell's special subframe configuration.

Alternatively, RSRQ may be defined by Table 2 according to an embodiment of the present invention.

TABLE 2

| Definition | RSRQ is defined as the ratio N × RSRP/(E-UTRA carrier RSSI), where N is the number of RB's of the E-UTRA carrier RSSI measurement bandwidth. The measurements in the numerator and denominator shall be made over the same set of resource blocks. E-UTRA carrier RSSI comprises the linear average of the total received power (in [W]) observed only in certain OFDM symbols of measurement subframes, in the measurement bandwidth, over N number of resource blocks by the UE from all sources, including co-channel serving and non-serving cells, adjacent channel interference, thermal noise etc. Option 1: Unless indicated otherwise by higher layers, RSSI is measured only from OFDM symbols containing reference symbols for antenna port 0 of measurement subframes. If higher layers indicate all OFDM symbols for performing RSRQ measurements, then RSSI is measured from all OFDM symbols of the DL part of measurement subframes. If higher-layers indicate certain subframes for performing RSRQ measurements, then RSSI is measured from all OFDM symbols of the DL part of the indicated subframes. Option 2: If higher layers indicate measurements based on discovery signals, RSSI is measured from all OFDM symbols of the DL part of the subframes in the configured discovery signal occasions. The reference point for the RSRQ shall be the antenna connector of the UE. If receiver diversity is in use by the UE, the reported value shall not be lower than the corresponding RSRQ of any of the individual diversity branches. |
|---|---|
| Applicable for | RRC_IDLE intra-frequency, RRC_IDLE inter-frequency, RRC_CONNECTED intra-frequency, RRC_CONNECTED inter-frequency |

Figure 6:
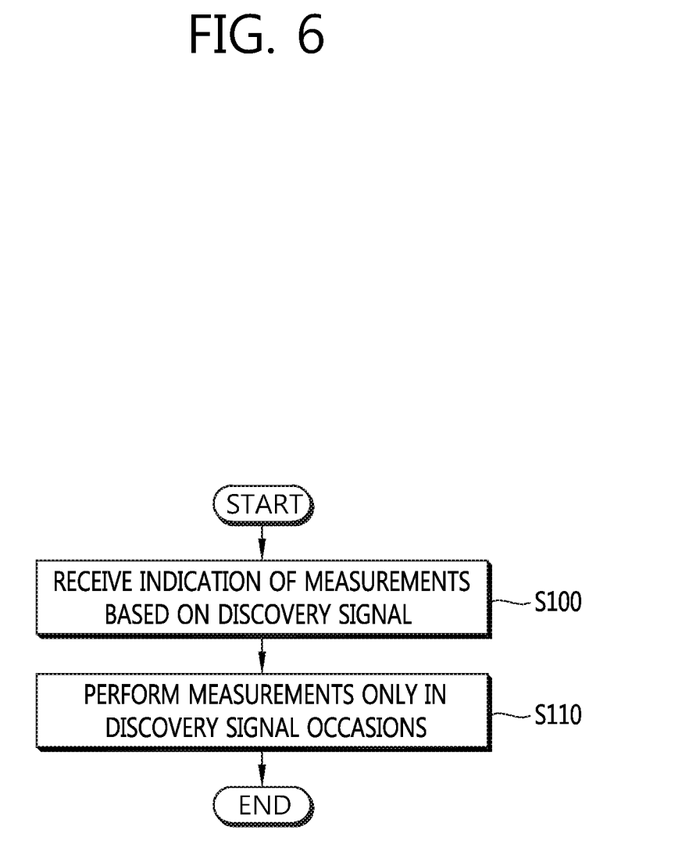
FIG. 6 shows an example of a method for performing measurements according to an embodiment of the present invention.

FIG. 6 shows an example of a method for performing measurements according to an embodiment of the present invention. In step S100, the UE receives an indication on measurements based on discovery signal from a network. In step S110, the UE performs measurements only in discovery signal occasions. The discovery signal may be a DRS. The UE may further receive the DRS from the network. The performing measurements may comprise measuring at least one of RSRP/RSRQ/RSSI. The UE may further receive a configuration indicating the discovery signal occasions.

Figure 7:
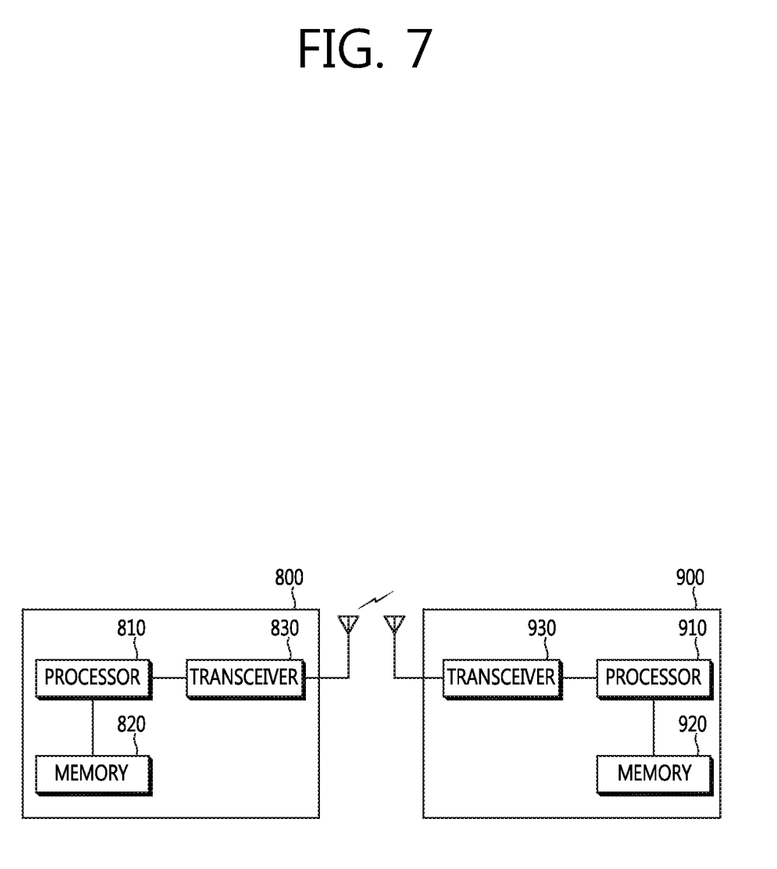
FIG. 7 shows a wireless communication system to implement an embodiment of the present invention.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
    receiving discovery signals in discovery signal occasions from a network, wherein the discovery signal occasions are determined by a discovery signal measurement timing configuration (DMTC), and a discovery signal occasion duration, and wherein the discovery signal occasions include consecutive downlink subframes starting from a secondary synchronization signal (SSS) subframe where a SSS is located;
    performing measurements based on the discovery signals in the discovery signal occasions; and
    transmitting a result of the measurements to the network.

2. The method of claim 1, wherein the measurements are not performed in subframes not used by the discovery signal occasions.

3. The method of claim 1, wherein the performing measurements comprises measuring at least one of a reference signal received power (RSRP), a reference signal received quality (RSRQ) or a received signal strength indicator (RSSI).

4. The method of claim 1, wherein the discovery signals include at least one of a primary synchronization signal (PSS), the SSS, a cell-specific reference signal (CRS), or a channel state information reference signal (CSI-RS).

5. The method of claim 1, wherein the discovery signal occasions are periodic with a periodicity configured by the DMTC.

6. The method of claim 1, wherein a number of the consecutive downlink subframes is the discovery signal occasion duration.

7. A user equipment (UE) in a wireless communication, the UE comprising:
    a memory;
    a transceiver; and
    a processor, operably coupled to the memory and the transceiver, that:
    controls the transceiver to receive discovery signals in discovery signal occasions from a network, wherein the discovery signal occasions are determined by a discovery signal measurement timing configuration (DMTC), and a discovery signal occasion duration, and wherein the discovery signal occasions include consecutive downlink subframes starting from a secondary synchronization signal (SSS) subframe where a SSS is located,
    performs measurements based on the discovery signals in the discovery signal occasions, and
    transmit a result of the measurements to the network.

8. The UE of claim 7, wherein the measurements are not performed in subframes not used by the discovery signal occasions.

9. The UE of claim 7, wherein the performing measurements comprises measuring at least one of a reference signal received power (RSRP), a reference signal received quality (RSRQ) or a received signal strength indicator (RSSI).

10. The method of claim 7, wherein the discovery signals include at least one of a primary synchronization signal (PSS), the SSS, a cell-specific reference signal (CRS), or a channel state information reference signal (CSI-RS).

11. The method of claim 7, wherein the discovery signal occasions are periodic with a periodicity configured by the DMTC.

12. The method of claim 7, wherein a number of the consecutive downlink subframes is the discovery signal occasion duration.

13. A method performed by a base station (BS) in a wireless communication system, the method comprising:
    transmitting discovery signals in discovery signal occasions to a user equipment (UE), wherein the discovery signal occasions are determined by a discovery signal measurement timing configuration (DMTC), and a discovery signal occasion duration, and wherein the discovery signal occasions include consecutive downlink subframes starting from a secondary synchronization signal (SSS) subframe where a SSS is located; and
    receiving a measurement report from the UE, wherein the measurement report is based on measurements, performed by the UE, based on the discovery signals in the discovery signal occasions.

14. The method of claim 13, wherein the measurements are not performed in subframes not used by the discovery signal occasions.

15. The method of claim 13, wherein the performing measurements comprises measuring at least one of a reference signal received power (RSRP), a reference signal received quality (RSRQ) or a received signal strength indicator (RSSI).

16. The method of claim 13, wherein the discovery signals include at least one of a primary synchronization signal (PSS), the SSS, a cell-specific reference signal (CRS), or a channel state information reference signal (CSI-RS).

17. The method of claim 13, wherein the discovery signal occasions are periodic with a periodicity configured by the DMTC.

18. The method of claim 13, wherein a number of the consecutive downlink subframes is the discovery signal occasion duration.

\* \* \* \* \*